United States Patent
Pirhonen et al.

(10) Patent No.: US 6,195,562 B1
(45) Date of Patent: *Feb. 27, 2001

(54) SYSTEM FOR LIMITING THE TRANSMITTED POWER OF A MOBILE COMMUNICATION MEANS

(75) Inventors: Riku Pirhonen; Tero Ojanperä, both of Helsinki (FI)

(73) Assignee: Nokia Mobile Phones Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/968,645

(22) Filed: Nov. 12, 1997

(30) Foreign Application Priority Data

Nov. 13, 1996 (FI) .................................................. 964548

(51) Int. Cl.$^7$ .............................. H04B 1/38; H04M 1/00
(52) U.S. Cl. ........................... 455/553; 455/522; 455/557
(58) Field of Search ................................... 455/522, 550, 455/552, 553, 557, 575, 90, 559, 127, 125, 574

(56) References Cited

U.S. PATENT DOCUMENTS

| | | | |
|---|---|---|---|
| D. 353,809 | 12/1994 | Nuovo et al. .................. D14/138 |
| 5,091,919 | 2/1992 | Kuisma ............................ 375/60 |
| 5,101,175 | 3/1992 | Vaisanen ........................ 330/279 |
| 5,109,538 | 4/1992 | Ikonen et al. .................. 455/89 |
| 5,118,965 | 6/1992 | Vaisanen et al. .............. 307/261 |
| 5,123,031 | 6/1992 | Kuisma ............................ 375/60 |
| 5,152,004 | 9/1992 | Vaisanen et al. .............. 45/68 |
| 5,199,110 | * 3/1993 | Adachi ............................ 455/126 |
| 5,204,643 | 4/1993 | Varronen ........................ 333/81 R |
| 5,214,372 | 5/1993 | Vaisanen et al. .............. 324/95 |
| 5,230,091 | 7/1993 | Vaisanen ........................ 455/88 |
| 5,241,694 | 8/1993 | Vaisanen et al. .............. 455/126 |
| 5,276,917 | 1/1994 | Vanhanen et al. ............. 455/89 |
| 5,291,147 | 3/1994 | Muurinen ....................... 330/136 |
| 5,291,150 | 3/1994 | Saarnimo et al. ............. 330/279 |
| 5,301,360 | * 4/1994 | Goldberg ....................... 455/575 |
| 5,392,464 | 2/1995 | Pakonen ......................... 455/115 |
| 5,404,585 | 4/1995 | Vimpari et al. ................ 455/115 |
| 5,423,078 | * 6/1995 | Epperson et al. ............. 455/553 |
| 5,432,473 | 7/1995 | Mattila et al. ................. 330/133 |
| 5,434,537 | 7/1995 | Kukkonen ....................... 330/2 |
| 5,450,620 | 9/1995 | Vaisanen ........................ 455/127 |
| 5,493,255 | 2/1996 | Murtojarvi ..................... 330/296 |
| 5,524,044 | 6/1996 | Takeda ........................... 379/58 |

(List continued on next page.)

FOREIGN PATENT DOCUMENTS

| | | |
|---|---|---|
| 0661824 | 7/1995 | (EP) . |
| 07283758 | 10/1995 | (JP) . |
| WO 93/01659 | 1/1993 | (WO) . |
| WO 96/34461 | 10/1996 | (WO) . |

OTHER PUBLICATIONS

Mobile Communications International, Issue 31, 1996, pp. 57–58.

*Primary Examiner*—Nguyen Vo
(74) *Attorney, Agent, or Firm*—Perman & Green, LLP

(57) ABSTRACT

The aim of the invention is to restrict the maximum transmitted power used by a mobile communication device. In most countries there are regulations in force which impose certain maximum limits on the power of electromagnetic radiation directed towards humans. These limits vary from country to country and will most probably be tightened in the future. In the system according to the invention, the upper limit of transmitted power is varied according to the mode of usage of the mobile communication device. A mobile communication device according to such a system meets the requirements made on a device operating close to the user's head, but the same mobile communication means may still be used in applications demanding greater transmitted power in a situation where the power limits placed on the radio set are less strict.

5 Claims, 3 Drawing Sheets

U.S. PATENT DOCUMENTS

Figure 1:
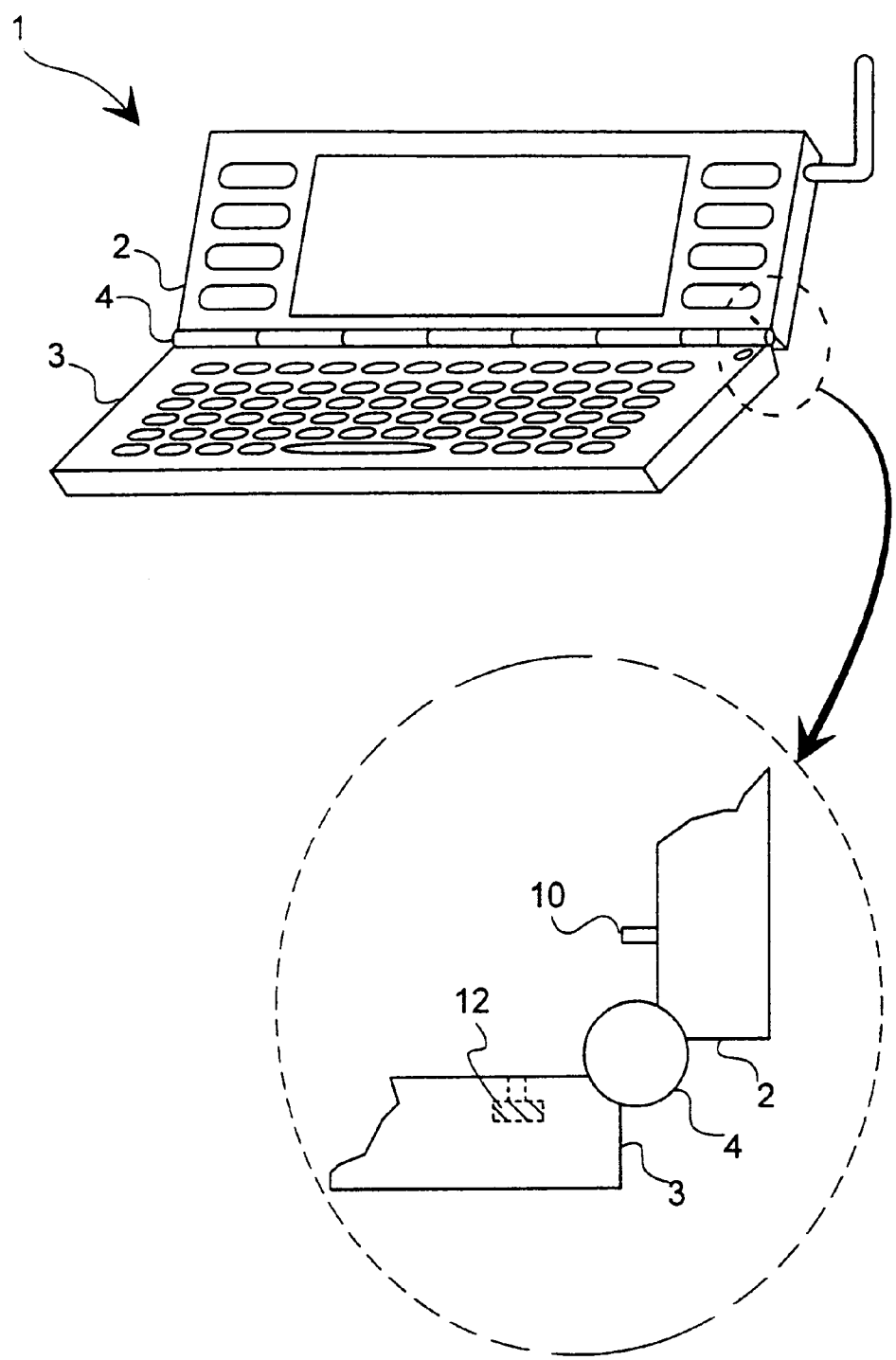

| | | | |
|---|---|---|---|
| 5,524,275 | 6/1996 | Lindell | 455/117 |
| 5,530,923 | 6/1996 | Heinonen et al. | 455/126 |
| 5,541,609 | 7/1996 | Stutzman et al. | 343/702 |
| 5,548,616 | 8/1996 | Mucke et al. | 375/295 |
| 5,564,074 | 10/1996 | Juntti | 455/67.1 |
| 5,675,611 | 10/1997 | Lehtinen et al. | 375/297 |
| 5,797,089 * | 8/1998 | Nguyen | 455/557 |

* cited by examiner

SYSTEM FOR LIMITING THE TRANSMITTED POWER OF A MOBILE COMMUNICATION MEANS

FIELD OF THE INVENTION

This invention is aimed at limiting the maximum transmitted power used by a mobile communication means.

BACKGROUND OF THE INVENTION

In most countries there are regulations in force which place certain maximum limits on the power of electromagnetic radiation directed towards humans. These limits vary from country to country and will most probably be tightened in the future.

On the other hand, as the transmission speed in mobile communication means systems increases, the amount of energy radiated by mobile communication means also increases. For example, in networks based upon TDMA technology, data transmission speeds may in principle be increased by using several successive time slots in the same TDMA frame, in which case the mean transmitted power increases. The use of several successive time slots in the same frame is possible in the Universal Mobile Telecommunication System (UMTS) under development and in new Global System for Mobile communications (GSM) standards which are under development. In CMDA systems the transmitted power has to be raised in line with the data transmission speed if one wishes to keep the bit error rate constant. In both basic techniques the amount of energy radiated by the antenna increases as the data transmission speed increases, in which case the permitted limits may at some stage be exceeded.

The radiation power caused by a particular radio set and directed towards the user is typically measured on the basis of the least favourable operating situation, in the case of a cordless telephone with the antenna almost pressed against the user's head. If a radio set may be used in many ways demanding differing transmitted power, for example for voice transmission and for high-speed data transfer, all functions of the radio set have to adjust to the limits which follow from the least favourable operating situation.

For example in the current GSM system, the maximum power of a mobile communication means which is used during one time slot is 2 W, which means that the mean transmitted power is approximately 250 mW. According to new GSM standards which are being developed, a mobile communication means may use for the high-speed data transfer as many as all eight time slots in one frame, in which case the mean transmitted power is 2 W. This causes problems if the 250 mW which is satisfactory for voice calls has been set as the upper limit of radio power directed towards the user's head. In this situation the mobile communication means may not use maximum power levels, but must use instantaneous transmitted power lower than in a voice call, so that the limit of mean transmitted power is not exceeded. This again causes audibility problems, since the base stations in the mobile communication means network are designed to cope with the needs of a voice link.

SUMMARY OF THE INVENTION

The aim of this invention is to create a system which adjusts the power level used by a mobile communication means to the mode of usage of the mobile communication means. A further aim of the invention is to create a system with the aid of which a mobile communication means may utilize the maximum permitted transmitted power in any given situation. In addition, an aim of the invention is to create a system with the aid of which the user may, if he so desires, limit the maximum values of electromagnetic radiation directed towards his body.

These aims are achieved by incorporating in the mobile communication means a device for identification of the mode of usage, and by arranging for the transmitted power of the mobile communication means to be limited according to the mode of usage and the type of current connection or connections.

Characteristic of the system according to the invention is what is described in the characteristic part of the independent claims. Dependent claims describe further advantageous embodiments of the invention. The invention is further directed to a mobile communication means, which is characterized by that which is described in the characterizing part of the corresponding independent claim.

In the system according to the invention, the upper limit of transmitted power used by the mobile communication means is varied according to the mode of usage. A mobile communication means according to such a system meets the more stringent requirements placed upon sets which are to be used next to the user's head, but the same mobile communication means may still be employed for applications demanding greater transmitted power in a situation where the power limits imposed on the radio set are less strict.

When a mobile communication means is used in a situation typical of a telephone, the mean power transmitted by the mobile communication means is limited to the maximum value for a telephone permitted by regulations and test procedures. When a mobile communication means is used for example as a data transfer device in conjunction with a portable computer, the maximum permissible transmitted power may be increased in accordance with the requirements of the data transfer rate employed.

SHORT DESCRIPTION OF THE DRAWINGS

Figure 2:
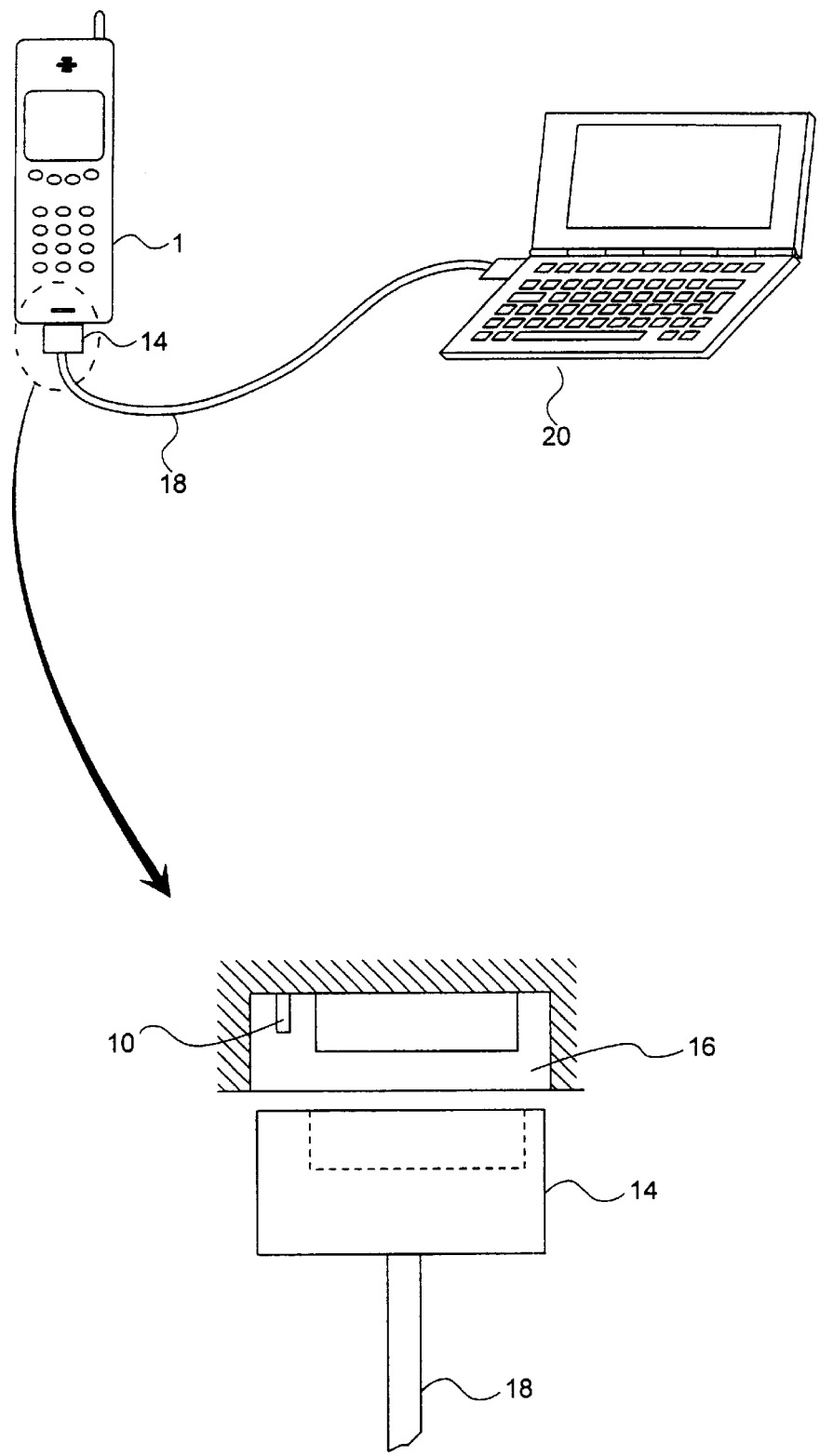
Figure 3:
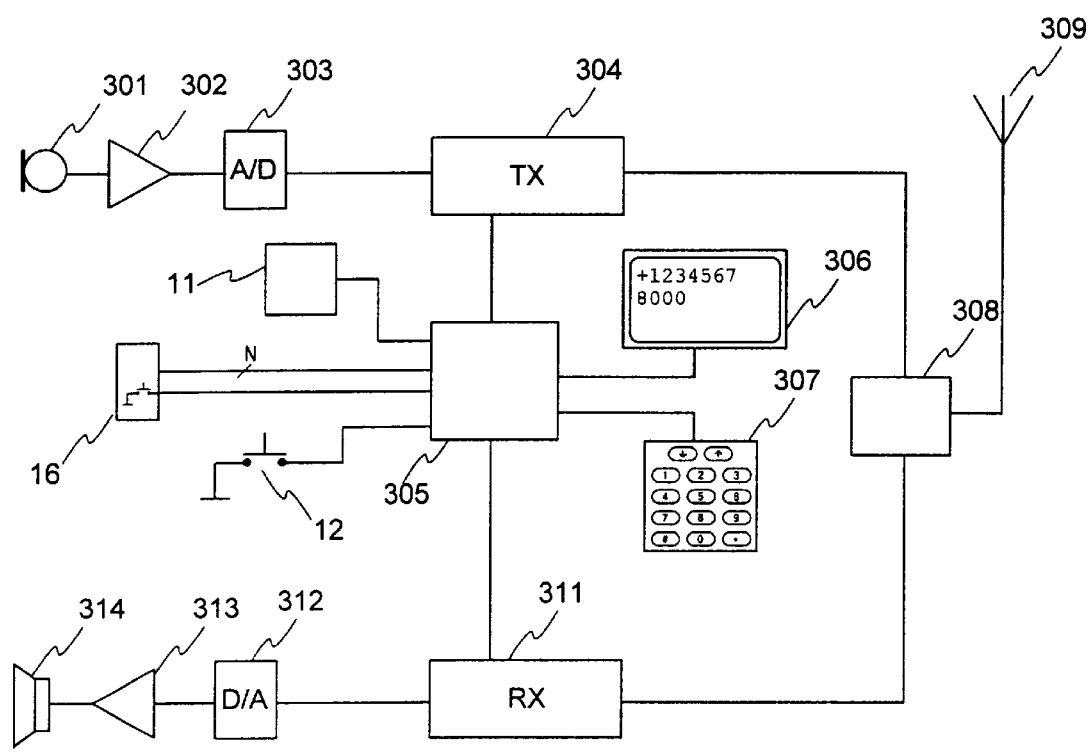

The invention will now be described in greater detail with reference to favourable embodiments, presented by way of example, and to the attached drawings, where FIG. 1 represents one possible mechanism for identification of the mode of usage of a mobile communication means, as used in the system according to the invention, FIG. 2 represents a second possible mechanism for identification of the mode of usage of a mobile communication means, as used in the system according to the invention, and FIG. 3 illustrates an advantageous embodiment of the invention.

In the drawings, the same reference numbers and symbols are used for parts which correspond to each other.

DETAILED DESCRIPTION OF THE PREFERRED INVENTION

In the system according to the invention, the transmitted power of a mobile communication means is limited according to its operating situation. When the mobile communication means is used as a cordless telephone next to the user's head, the system restricts the transmitted power of the mobile communication means to the limits demanded by this situation. When the user connects the mobile communication means to a portable microcomputer, for the purpose of data transfer for example, the system permits the use of transmitted power greater than in the preceding situation, in which case the mobile communication means may use transmission speeds higher than the transmission speed required for a talking connection. Without impairment of the quality of the link. A mobile communication means equipped with such a system is capable of adhering to differing transmitted power limits according to different operating situations, with the possibility however of using the high transmitted power required by high transmission speeds when it is both necessary and possible.

In the system according to this invention, several different methods may be employed for identification of the mode of usage of the mobile communication means, depending upon the design of the mobile communication means to which the invention is applied.

Some mobile communication means are openable, so that, when the mobile communication means is closed, the communication means acts as a cordless telephone, and when it is open the communication means acts, for example, as a portable computer and multi-purpose communication means, which may be used for data transfer in many ways employing known technology. An example of this which may be mentioned is the GSM multi-purpose communication means, as presented, for example, on pages 57–58 of issue 31, 1996, of Mobile Communications International. FIG. 1 contains a particular solution according to the invention as applied to such a mobile communication means. On different sides of a hinge 4 for connection of two openable parts 2, 3 of a mobile communication means are situated a switch 12 in a recess and a pin 10. When the mobile communication means is closed for normal telephone operation, the pin 10 presses against the switch 12. When the user opens the mobile communication means, the pin 10 releases the switch 12, so that the system according to the invention receives information concerning a change of mode of usage of the mobile communication means.

The structure in FIG. 1 is merely an example of a possible solution. Monitoring of the cover position may, in the system according to the invention, be realized in many other ways familiar to men skilled in the art.

Mobile communication means are frequently used connected to a portable computer. FIG. 2 shows one particular method of detection of the mode in such a configuration. In FIG. 2, a portable computer 20 is connected by means of a connection cable 18 to a mobile communication means 1. At the interface 16 of the mobile communication means 1 there is a pin 10, which is pressed down by the plug 14 of the connection cable 18 when the user inserts the plug 14 into the mobile communication means. The pin 10 may for example press against a mechanical switch so that the system is notified of the change of mode. Connected to a portable computer, the mobile communication means is usually employed purely for data transfer, in which case the computer acts as a terminal, for example, with which the user links up to the computing system at his place of work. In such a situation high transmission speeds are also an advantage. In such an application a system according to the invention permits the use of high transmitted power necessitated by the data transfer rates when the plug 14 is inserted into the connection socket 16. When the connection cable 18 is not connected to the mobile communication means 1, the system according to the invention only permits the use of transmitted power as required for a voice call.

Identification of the mode of usage may also be based upon the use of a position switch or any other conventional position sensing device, in which case the system permits the use of high transmitted power when the mobile communication means is in the horizontal plane or sufficiently close to a horizontal position, for example when it is placed on a table. The position switch is to best advantage designed to recognize in particular when that side of the mobile communication means which is greatest in surface area is horizontal. With such an arrangement it is possible to avoid incorrect mode identification, for example in a situation where the user is speaking into the mobile communication means at the same time as leaning backwards in an armchair.

In the mobile communication means there may be a special pull-out alphanumeric keyboard for the entry of text. In such a mobile communication means identification of the mode may be based upon the position of the keyboard: the system interprets the set as being in telephone use when the keyboard is retracted within the set, and in data transfer use when the keyboard is pulled out.

In a system according to this invention, restriction of the mean transmitted power being used may be effected in a number of different ways. In time division mobile communication means systems, the mean transmitted power may be reduced by decreasing the number of time slots transmitted in one frame, in which case the data transmission speed drops. The mean transmitted power may also be reduced by decreasing the instantaneous power used during one time slot, in which case the number of time slots to be transmitted may be kept constant.

Limitation of the transmitted power may to best advantage be effected according to the operating situation. For example, if the mobile communication means is transmitting a file from its memory at a high data transfer rate using several time slots precisely when the user switches the telephone to a mode in which the set is used principally as a telephone, the method for limitation of transmitted power which is employed may be chosen on the basis of the type of data transmission connection. If the transmission connection used permits a change in the transmission speed, the system reduces the number of time slots used. If the transmission connection does not permit a change in the transmission speed, the number of time slots used must be kept constant, in which case the transmitted power used during one time slot must be reduced. In conditions of good audibility this is not a problem, but reduction of transmitted power at the margins of the area covered by the base station may cause an increase in bit error probability or interruption of the connection.

Power transmitted in CDMA systems may be reduced either by lowering the data transmission speed, in which case the quantity of energy transmitted by the mobile communication means falls, or by keeping the data transmission speed the same but reducing the transmitted power, for example by decreasing the transmitter's output stage amplification, in which case the bit error rate of the connection increases. The choice of the best procedure thus depends upon the quality of the connection in the CDMA system, upon the data transmission speed and upon the quality of the transmission connection.

Owing to the various effects of the different ways of limiting transmitted power as described above, the user may to his advantage determine in advance the type of power limiting method which the mobile communication means should use in the first place. The user may, for example, decide that the mobile communication means should in the first place reduce the number of time slots used, in which case the connection will be maintained more securely, and that the power used during one time slot should be reduced only when some other type of function is not possible.

In the system according to this invention, the maximum power limit observed by the system when the mobile communication means is used as a telephone may be set on manufacture of the mobile communication means on the basis of test measurements carried out on samples. Owing to changes in the limits set by the authorities and to the differing regulations in different countries, it is an advantage if the said power limit can be changed at a later stage either by the retailer or by the user of the mobile communication means.

The system according to the invention may furthermore restrict the modes of usage of the mobile communication means when the mobile communication means uses a high transmitted power. The system may, for example, totally prevent use of the mobile communication means as a telephone, or permit only calls made with the aid of the hands-free function. With such an arrangement it is possible to affect the user in such a way that he does not use the mobile communication means in a situation in which the mobile communication means exceeds the limits according to issued regulations.

The system according to the invention may thus restrict the function of the mobile communication means in addition to limiting of the transmitted power, by restricting the mode of usage. The system may then react to a change in mode when a high data transmission speed and a high transmitted power are in use, for example in the following three ways:

- by reducing the number of time slots used during one frame,
- if this is not possible on account of the transmission mode used, by reducing the power used during one time slot, or
- by preventing the making of a normal call, if a decrease in the transmitted power used in data transfer threatens to interrupt the transmission connection.

FIG. 3 shows a block diagram of a digital mobile communication means according to an advantageous embodiment of the invention. The mobile communication means comprises a microphone 301, keyboard 307, display 306, earpiece 314, antenna duplexer or switch 308, antenna 309 and a control unit 305, which all are typical components of conventional mobile communication means. Further, the mobile communication means contains typical transmission and receiver blocks 311, 304. Transmission block 311 comprises functionality necessary for speech and channel coding, encryption, and modulation, and the necessary RF circuitry for amplification of the signal for transmission. Receiver block 304 comprises the necessary amplifier circuits and functionality necessary for demodulating and decryption of the signal, and removing channel and speech coding. The signal produced by the microphone 301 is amplified in the amplifier stage 302 and converted to digital form in the A/D converter 303, whereafter the the signal is taken to the transmitter block 304. The transmitter block encodes the digital signal and produces the modulated and amplified RF-signal, whereafter the RF signal is taken to the antenna 309 via the duplexer or switch 308. The receiver block 311 demodulates the received signal and removes the encryption and channel coding. The resulting speech signal is converted to analog form in the D/A converter 312, the output signal of which is amplified in the amplifier stage 313, whereafter the amplified signal is taken to the earpiece 314. The control unit 305 controls the functions of the mobile communication means, reads the commands given by the user via the keypad 306 and displays messages to the user via the display 307. Further, the control unit communicates with external devices via the connection socket 16 and monitors the state of the switch inside the communication socket 16 as well as other switches 12 indicating the mode of usage of the communication means. The control unit may also monitor the output signal of a position sensing device 11. The control unit then controls the transmitting power of the communication means and/or allows and/or restricts the mode of usage of the communication means in the ways described previously. When performing such control, the control unit may take also into account the types of the connections active at that time. For example, if one of the connections is for communication of speech and the mobile communication means is not in a hands-free mode, the control unit may limit the transmitting power. As a further example, if the mobile communication means is in a hands-free mode, the control unit may allow any necessary transmission mode and power to be used, since the user will most likely not have the mobile communication means close to his/her body in such a situation.

The present invention is not limited to the embodiment of FIG. 3, which is presented as an example only. For example, the invention can as well be applied to an analog communication means.

With the aid of the system according to the invention the mobile communication means user may limit the amount of radiation directed towards his body.

A mobile communication means utilizing the system according to the invention may be employed both as a cordless telephone and as a high-speed data transfer device and in both operating situations it may use the maximum mean transmitted power permitted in the operating situation in question.

The invention has been explained above with reference to certain favourable applications thereof, but it is clear that the invention may be varied in many different ways within the framework of the innovative concept defined in the attached Patent Claims.

What is claimed is:

1. A system for limiting the transmitted power of a mobile communication means having at least one connection having a connection type comprising
   at least one means for producing an indication of the mode of usage of the mobile communication means, one mode of usage being for voice transmission and another mode of usage being for data transmission; and
   a control unit for controlling the functions of the mobile communication means and for controlling the magnitude of the transmitting power of the mobile communication means as a response to said means for producing an indication of the mode of usage thereof and the connection type of the at least one connection;
   wherein the control unit is operable for limiting the number of time slots used for transmission in one frame of a time division mobile communication means system as a response to an indication produced by said means for identification and the connection type of the at least one connection, transmitted power being a function of the number of time slots transmitted in one frame of the time division mobile communication means system.

2. A system according to claim 1 comprising
   a connector for connecting an external cable,
   and in which system at least one of said at least one means for producing an indication is a switch indicating whether or not there is a cable connected to said connector.

3. A system in according to claim 1 comprising
a first part, a second part, and at least one hinge for rotatably attaching said first part to said second part,
and in which system at least one of said at least one means for producing an indication is a means for producing an indication of the relative position of said first and second parts of the mobile communication means.

4. A system in according to claim 1 wherein
at least one of said at least one means for producing an indication is a position sensing device.

5. A mobile communication means having at least one connection having a connection type comprising
at least one means for producing an indication of the mode of usage of the mobile communication means, one mode of usage being for voice transmission and another mode of usage being for data transmission,
a control unit for controlling the functions of the mobile communication means and for controlling the transmitting power of the mobile communication means as a response to an indication produced by said means for identification and the connection type of the at least one connection;
wherein the control unit is operable for limiting the number of time slots used for transmission in one frame of a time division mobile communication means system as a response to an indication produced by said means for identification and the connection type of the at least one connection, transmitted power being a function of the number of time slots transmitted in one frame of the time division mobile communication means system.

* * * * *